US011429169B2

(12) United States Patent
Waters

(10) Patent No.: US 11,429,169 B2
(45) Date of Patent: Aug. 30, 2022

(54) VCONN IN POWER DELIVERY CHARGERS

(71) Applicant: TEXAS INSTRUMENTS INCORPORATED, Dallas, TX (US)

(72) Inventor: Deric Wayne Waters, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 17/220,354

(22) Filed: Apr. 1, 2021

(65) Prior Publication Data
US 2021/0223841 A1 Jul. 22, 2021

Related U.S. Application Data

(62) Division of application No. 16/044,250, filed on Jul. 24, 2018, now Pat. No. 10,990,150.

(51) Int. Cl.
G06F 1/26 (2006.01)
G06F 1/3215 (2019.01)
H01R 24/60 (2011.01)
G06F 13/40 (2006.01)
G06F 1/3296 (2019.01)

(52) U.S. Cl.
CPC ............ G06F 1/266 (2013.01); G06F 1/3215 (2013.01); G06F 1/3296 (2013.01); G06F 13/4068 (2013.01); H01R 24/60 (2013.01)

(58) Field of Classification Search
None
See application file for complete search history.

(56) References Cited

U.S. PATENT DOCUMENTS

| 6,992,467 | B1 | 1/2006 | Fey |
| 7,759,906 | B2 | 7/2010 | Ferguson |
| 8,166,222 | B2 | 4/2012 | Garlapati et al. |
| 8,225,250 | B2* | 7/2012 | Yamazaki ............ G06F 30/394 716/136 |
| 9,727,123 | B1 | 8/2017 | Nayak et al. |

(Continued)

OTHER PUBLICATIONS

"USB Power Delivery Specification Revision 3.0, Version 1.2," Copyright 2010-2018, USB 3.0 Promoter Group: Apple Inc., Hewlett-Packard Inc., Intel Corporation, Microsoft Corporation, Renesas, STMicroelectronics, and Texas Instruments, 614 p.

(Continued)

Primary Examiner — Keshab R Pandey
(74) Attorney, Agent, or Firm — Valerie M. Davis; Charles A. Brill; Frank D. Cimino

(57) ABSTRACT

A circuit comprising a first processing element having a first output configured to couple to a voltage control circuit, a second output configured to couple to a gate terminal of a first transistor, and a third output configured to couple to a first node and a control circuit. The control circuit comprises a second processing element having multiple outputs, a second transistor having a gate terminal configured to couple to one of the outputs of the second processing element, a first terminal configured to couple to a second node and to a drain terminal of the first transistor, and a second terminal, and a third transistor having a gate terminal configured to couple to a second of the outputs of the second processing element, a first terminal configured to couple to a third node, and a second terminal.

16 Claims, 4 Drawing Sheets

(56) References Cited

U.S. PATENT DOCUMENTS

| | | | |
|---|---|---|---|
| 2015/0212497 A1* | 7/2015 | Dunstan | G06F 1/26 |
| | | | 307/130 |
| 2017/0060205 A1 | 3/2017 | Bharath et al. | |
| 2017/0222459 A1* | 8/2017 | Kang | H02J 7/007 |
| 2017/0256976 A1 | 9/2017 | Mao | |
| 2018/0287366 A1* | 10/2018 | Yeh | H02H 5/041 |
| 2019/0356237 A1 | 11/2019 | Mao | |

OTHER PUBLICATIONS

"Universal Serial Bus Type-C Cable and Connector Specification," Release 1.3, Jul. 14, 2017, Copyright 2014-2017, USB 3.0 Promoter Group: Apple Inc., Hewlett-Packard Inc., Intel Corporation, Microsoft Corporation, Renesas, STMicroelectronics, and Texas Instruments, 247 p.

* cited by examiner

VCONN IN POWER DELIVERY CHARGERS

CROSS-REFERENCE TO RELATED APPLICATIONS

This application is a Division of U.S. patent application Ser. No. 16/044,250 filed Jul. 24, 2018 (currently U.S. Pat. No. 10,990,150 issued Apr. 27, 2021).

BACKGROUND

Universal Serial Bus (USB) is a standard that specifies specifications for USB cables and communications protocols for communicating data and/or power between at least two USB capable devices. Multiple specifications exist for various types of USB cables and their attendant capabilities. Some of these types include USB type-A (USB-A), USB type-B (USB-B), USB type-C (USB-C), and others. As technology progresses and the capabilities of various types of USB cables and their capabilities increases, the USB cables may advertise or otherwise inform connected devices of the capabilities of the USB cables, thereby leading to areas of potential optimization, improvement, or change in the interaction between USB cables and devices to which they are coupled or configured to couple.

SUMMARY

Aspects of the present disclosure provide for a circuit comprising a first processing element having a first output configured to couple to a voltage control circuit, a second output configured to couple to a gate terminal of a first transistor, and a third output configured to couple to a first node and a control circuit. The control circuit comprises a second processing element having multiple outputs, a second transistor having a gate terminal configured to couple to one of the outputs of the second processing element, a first terminal configured to couple to a second node and to a drain terminal of the first transistor, and a second terminal, and a third transistor having a gate terminal configured to couple to a second of the outputs of the second processing element, a first terminal configured to couple to a third node, and a second terminal.

Other aspects of the present disclosure provide for a system. The system comprises a power supply having an output coupled to a first node, a voltage control circuit having a first input coupled to the first node, a second input, and an output, a first processing element having a first output coupled to the second input of the voltage control circuit, a first input coupled to the output of the voltage control circuit, a second output coupled to a second node, and a third output, a first transistor having a gate terminal coupled to the third output of the first processing element, a first terminal coupled to the first node, and a second terminal coupled to the second node, and a control circuit having an input coupled to the first node, a first output coupled to a third node, and a second output couple to a fourth node. The system further comprises a Universal Serial Bus (USB) plug receptacle comprising a first bus voltage (VBUS) terminal coupled to the second node, a first configuration channel (CC1) terminal coupled to the third node, and a second configuration channel (CC2) terminal coupled to the fourth node and a USB cable. The USB cable comprises a USB plug comprising a second VBUS terminal configured to couple to the first VBUS terminal, a CC terminal configured to couple to one of the CC1 terminal or the CC2 terminal, a connector voltage (VCONN) terminal configured to couple to another of the CC1 terminal or the CC2 terminal, and an electronic marker (e-marker) coupled to the VCONN terminal, wherein the control circuit is configured to couple the e-marker to the first node via one of the CC1 terminal or the CC2 terminal and the VCONN terminal.

Other aspects of the present disclosure provide for a method, comprising detecting, by a controller, a coupling from a sink device to a source device, applying, by the controller, a signal to a bus voltage (VBUS) terminal and a connector voltage (VCONN) terminal of a cable performing the coupling, communicating, by the controller, with the cable performing the coupling to determine characteristics of the cable, removing, by the controller, the signal from the VCONN terminal, communicating, by the controller, with the sink device at least partially according to the characteristics of the cable, and increasing, by the controller, a value of the signal provided to the VBUS terminal beyond an acceptable limit for providing to the VCONN terminal.

Communication with active USB cables often involves separate high-voltage and low-voltage power supplies, increasing the cost and size of a system communicating with the active USB cable. A value of the high-voltage power supply may be too large for the high-voltage power supply to replace the low-voltage power supply in operation at all times. When the high-voltage power supply has a variable output capable of providing both the low-voltage and the high-voltage, the high-voltage power supply may be configured to provide both the high-voltage and low-voltage. However, the high-voltage supply may cause damage when the high-voltage supply is providing the high-voltage and is coupled to a terminal configured to receive the low-voltage. To at least partially mitigate this problem, a controller may monitor the output of the high-voltage power supply and selectively couple, or decouple, the high-voltage power supply from the terminal configured to receive the low-voltage when certain conditions are met.

BRIEF DESCRIPTION OF THE DRAWINGS

For a detailed description of various examples, reference will now be made to the accompanying drawings in which.

DETAILED DESCRIPTION

Figure 1:
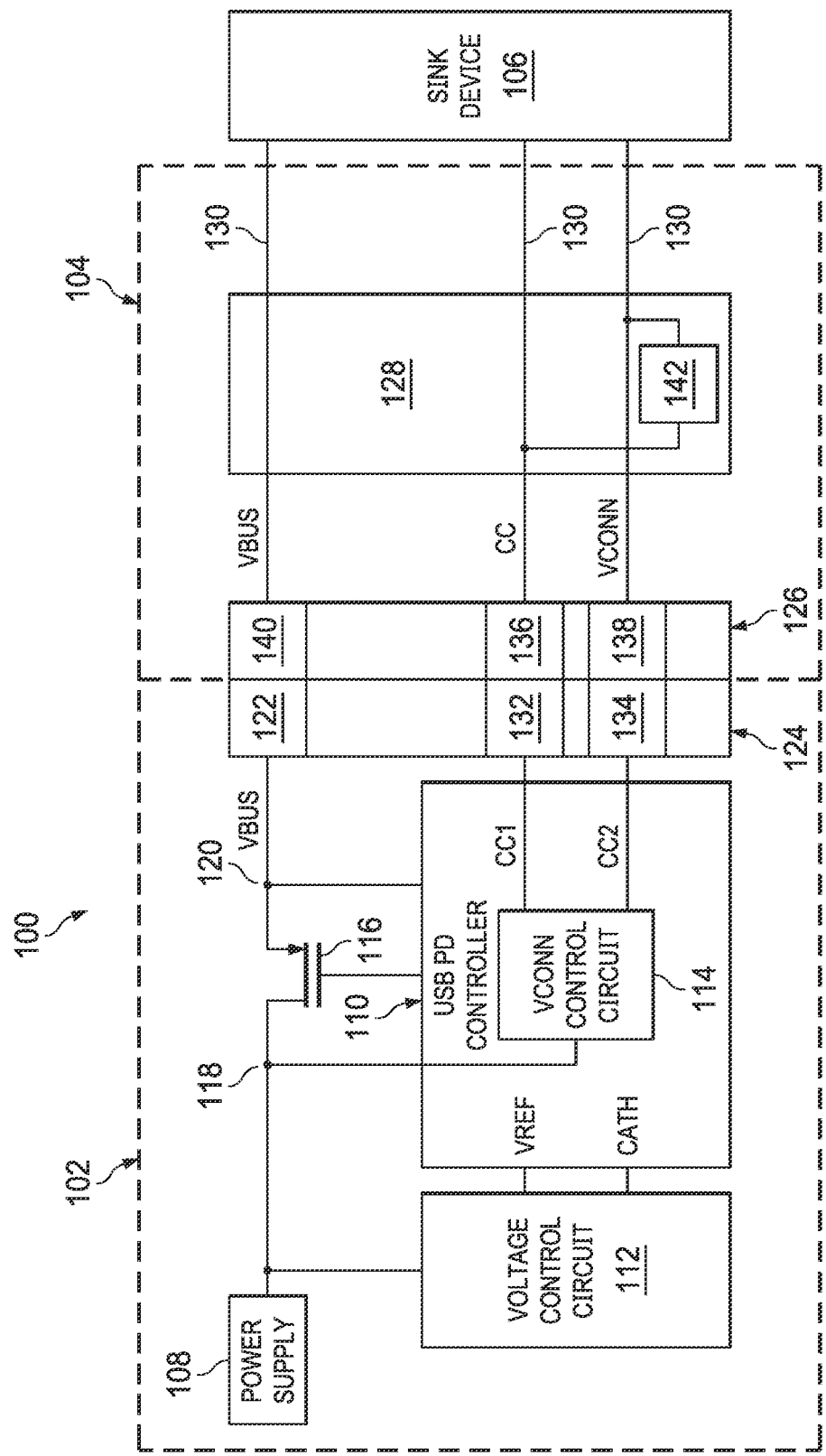
FIG. 1 shows a block diagram of an illustrative system in accordance with various examples.

Universal Serial Bus (USB) cables referred to herein include at least one plug, a paddle card configured to provide processing capabilities, and a one or more electrically conductive or optically transmissive wires. Some USB paddle cards (e.g., such as USB-C paddle cards) include an electronic chip referred to as an electronic marker (e-marker) capable of communicating with devices to which the USB paddle card is coupled. Devices to which the USB paddle card is coupled, in some examples, query the e-marker to determine capabilities of the USB cable. The capabilities may include any specifications, operational limits, or other information related to, or potentially useful in, utilizing the USB cable. At least one example of such a capability communicated by the e-marker is a maximum current rating of the USB cable (e.g., the amount of current that the USB cable can carry without suffering damage and/or a lack of fidelity in a data transfer involving the USB cable). To communicate with the e-marker, a device coupled to the USB paddle card provides a signal having a voltage between approximately 3 volts (V) and approximately 5V to a connector voltage (VCONN) terminal of the USB paddle card to activate the e-marker. To provide the 5V signal, it is common, and sometimes required, to include a low-voltage supply within the device communicating with the USB paddle card. In some circumstances, this low-voltage supply may serve no other purpose in the device communicating with the USB paddle card and exists solely for communication with USB paddle cards to activate e-markers for communication. In such circumstances, the low-voltage supply may increase the size, complexity, cost of manufacture, cost of operation, and/or other undesirable characteristics of the device communicating with the USB paddle card.

One option for elimination of the dedicated low-voltage supply is to utilize an existing signal passing through the USB paddle card for activating the e-marker, for example, such as a signal present at a bus voltage (VBUS) terminal of the USB paddle card. However, in modern USB standards, such as USB-C, the VBUS terminal may at times have voltages greater than 5V (or 5V plus an over-voltage tolerance level of the e-marker), which if applied to the e-marker might damage and/or destroy the e-marker. For example, when the USB cable is utilized as a charging cable, a signal having a voltage of up to approximately 20V or greater may be present at the VBUS terminal.

At least some aspects of the present disclosure provide for a circuit enabling powering of a VCONN terminal of a USB paddle card utilizing a VBUS signal while preventing a voltage present at the VCONN terminal of the USB paddle card from exceeding a predefined voltage level (such as 5V), or the predefined voltage level plus an associated over-voltage tolerance. In some examples, the circuit is implemented in a Power Delivery (PD) Controller (e.g., a USB PD controller of a device configured to couple to a USB paddle card). In other examples, the circuit is implemented as a standalone component configured to couple to a PD Controller and/or a USB paddle card. In at least one example, the disclosed circuit monitors a VBUS voltage level and toggles a switch to couple (or decouple) the VBUS signal to (or from) the VCONN terminal of the USB paddle card based on the VBUS voltage level. In some examples, the determination of whether to couple (or decouple) the VBUS signal to (or from) the VCONN terminal of the USB paddle card is further based on whether the device including the circuit is attempting, or will attempt, to activate and/or communicate with an e-marker of the USB paddle card. In at least some examples, the circuit includes one or more switches and a microcontroller configured to perform the monitoring and control the one or more switches to perform the coupling (or decoupling) of the VBUS signal to (or from) the VCONN terminal. The switches can be any suitable switching mechanism including field effect transistors (FETs) such as metal oxide FETs (MOSFETs), bi-polar junction transistors (BJTs), mechanical switches such as relays, or any other suitable switching technology and/or architecture.

Referring now to FIG. 1, a block diagram of a USB system 100 is shown. In one example, the USB system includes a source device 102, a USB cable 104, and a sink device 106. The source device 102, in at least one example, is a device providing a signal to the sink device 106 via the USB cable 104 such that the sink device 106 pulls current from the source device 102 via the USB cable 104. In at least some examples, the source device 102 includes a power supply 108, a USB PD controller 110, and a voltage control circuit 112. The power supply 108 is a power supply capable of providing an output signal with an adjustable voltage level that is adjusted, for example, based on a control signal received by the power supply 108. In at least some examples, the power supply 108 receives the control signal from the voltage control circuit 112. In some examples, the power supply 108 receives the control signal from the voltage control circuit 112 via optical communication (e.g., an optocoupler), while in other examples the power supply 108 receives the control signal from the voltage control circuit 112 via a physical coupling between the power supply 108 and the voltage control circuit 112. In other examples, the power supply 108 itself is not adjustable, but an external component coupled, or configured to couple, to an output of the power supply 108 adjusts a value of a signal output by the power supply 108. For example, the power supply output may be a signal having a substantially constant voltage value that is manipulated to output one or more other signals having different voltage values than the power supply output. For example, the power supply output may be manipulated by a power converter (not shown), such as a buck converter, a boost converter, or a buck-boost converter, and an output of the power converter may be provided to the node 118. In at least some examples, the power converter is controlled by the voltage control circuit 112 to manipulate the power supply output to form the one or more other signals. The USB PD controller 110, in at least one example, is a microcontroller having processing capabilities. In other examples, the USB PD controller 110 is any processing element capable of receiving one or more inputs and generating one or more outputs based on rules, analysis, or other processing applied to at least some of the inputs.

The voltage control circuit 112 is any circuit capable of regulating and/or controlling a value of the signal that is present at node 118. For example, the voltage control circuit 112 is any circuit capable of receiving a reference voltage (VREF) from the USB PD controller 110 and controlling power supply 108 according to VREF to control the value of the signal present at node 118. For example, the voltage control circuit 112 controls the power supply 108 according to VREF to cause the signal present at node 118 to have a value approximately equal, proportional, or otherwise having a relationship to a value of the reference voltage, a scope of which is not limited herein.

The USB PD controller 110, in at least some examples, includes and/or implements at least a portion of a VCONN control circuit 114. For example, when the USB PD controller 110 is a microcontroller, at least a portion of the VCONN control circuit 114 is implemented as particular programming within the USB PD controller 110 to perform at least some of the operations disclosed herein. In other examples, the VCONN control circuit 114 is implemented separately from the USB PD controller 110 (e.g., as a separate microcontroller or other processing element) and configured to couple to the USB PD controller 110. In some examples, the source device 102 further includes a transistor 116 operable as a switch to control output of the VBUS signal via a VBUS terminal 122 of the source device 102 and a receptacle 124 configured to receive a plug to provide communicative coupling with the source device 102. The transistor 116 may be of any suitable technology, including at least p-type FET or n-type FET.

In at least one example architecture, an output of the power supply 108 is coupled to a node 118, an input of the voltage control circuit 112 is coupled to the node 118, a first terminal of the VCONN control circuit 114 is coupled, or configured to couple, to the node 118, and a first terminal (e.g., a drain terminal) of the transistor 116 is coupled to the node 118. A first input of the voltage control circuit 112 is coupled to a VREF output of the USB PD controller 110, and a first output of the voltage control circuit 112 is coupled to a CATH input of the USB PD controller 110. A first terminal of the USB PD controller 110 is coupled to a gate terminal of the transistor 116, a second terminal of the USB PD controller 110 is coupled to node 120, a second terminal (e.g., a source terminal) of the transistor 116 is coupled to node 120, and the VBUS terminal 122 is coupled to node 120. A second terminal of the VCONN control circuit 114 is configured to couple to a configuration channel (CC1) terminal 132 and a third terminal of the VCONN control circuit 114 is configured to couple to a CC2 terminal 134. In various examples, CC1 and CC2 are each configurable to couple to a VCONN terminal 138 of the USB cable 104 or a CC terminal 136 of the USB cable 104, depending on the orientation in which the plug 126 is inserted into the receptacle 124. In some examples, the VBUS terminal 122, the CC1 terminal 132, and the CC2 terminal 134 are housed in, are a part of, or otherwise interact with the receptacle 124 to communicatively couple the source device 102 to the USB cable 104.

In at least one example, the USB cable 104 includes a plug 126 configured to interact with the receptacle 124 to communicatively couple the USB cable 104 to the source device 102. The plug 126 houses, includes, or otherwise interacts with a VBUS terminal 140, the CC terminal 136, and the VCONN terminal 138 each configured to communicatively couple the USB cable 104 to the source device 102. The USB cable 104 further includes a paddle card (e.g., a circuit board) 128 configured to facilitate communication via the USB cable 104 and one or more electrically conductive or optically transmissive wires 130 to further facilitate communication via the USB cable 104. The paddle card 128 includes one or more electrical components, the scope of which is not limited herein, including at least an e-marker 142. The e-marker 142, in some examples, includes couplings to at least the CC terminal 136 and the VCONN terminal 138.

The sink device 106 may be any device suitable for coupling to the USB cable 104 to receive power from the source device 102 and/or communicate data with the source device 102 and the scope of the sink device 106, its hardware architecture, or its method of operation are not limited herein. In at least some examples, the sink device 106 also implements a USB controller substantially similar to the USB PD controller 110 and/or includes functionality substantially similar to the VCONN control circuit 114.

In an example of operation of the system 100, after the source device 102 (e.g., the USB PD controller 110) determines that a sink device 106 has been connected to the source device 102 via the USB cable 104, the USB PD controller 110 controls the power supply 108 to output a signal having voltage level specified by a control signal received by the power supply 108. The USB PD controller 110 controls the power supply 108 to output the signal, for example, by controlling the voltage control circuit 112.

In at least some examples, the USB PD controller 110 applies pull-up signals on both the CC1 terminal 132 and the CC2 terminal 134 and monitors the value of the signal present at each of the CC1 terminal 132 and the CC2 terminal 134. In some examples, each of the pull-up signals has a substantially same voltage level. In other examples, each of the pull-up signals may have a different voltage level. For example, the USB PD controller 110 compares the value of the signal present at each of the CC1 terminal 132 and the CC2 terminal 134 to a threshold value to determine whether it is less than a value of the pull-up signal (or some proportionate amount of the value of the pull-up signal). For example, the source device 102 may monitor the CC1 terminal 132 and/or the CC2 terminal 134 for the presence of an Open state, a Rd-attached state, or a Ra-attached state. The Open state exists for a CCx terminal (e.g., either of the CC1 terminal 132 or the CC2 terminal 134) when the value of the signal present at that CCx terminal is above a first threshold (in one example, 1.6V). The Rd-attached state exists for a CCx terminal when the signal present at that CCx terminal is below the first threshold and above a second threshold (in one example, 0.25V). The Ra-attached state exists for a CCx terminal when the signal present at that CCx terminal is below the second threshold.

In some examples, the USB PD controller 110 ignores the presence of the USB cable 104 when the sink device 106 is not coupled to the USB cable 104 (and thereby, the source device 102). For example, when the CCx terminal is in the Ra-attached state and a CCy terminal (e.g., either of the CC1 terminal 132 or the CC2 terminal 134 that is not the CCx terminal that is in the Ra-attached state) is in the Open state, the USB PD controller 110 ignores the presence of the USB cable 104 and does not communicate with the USB cable 104. In other examples, the USB controller 110 communicates with the USB cable 104 when the CCx terminal is in the Ra-attached state and the CCy terminal is in the Open state.

In at least some examples, when the USB PD controller 110 detects the presence of the sink device 106, the USB PD controller 110 applies a signal to the VBUS terminal 122, for example, by controlling the power supply 118 to output a voltage having a safe value for the e-marker 142 (e.g., equal or approximately equal to a voltage specified for activating the e-marker 142, such as 5V in some examples) and controlling the switch 116 to couple node 118 to VBUS terminal 122. In some examples, the USB PD controller detects the presence of the sink device 206 in one of two ways. First, when the CCx terminal is in the Rd-attached state and the CCy terminal is in the Open state or the Ra-Attached state, the USB PD controller 110 determines the sink device 206 to be coupled to the source device 102. Second, when the CCx terminal is in the Open state or Ra-Attached state and the CCy terminal is in the Rd-attached state, the USB PD controller 110 also determines the sink device 206 to be coupled to the source device 102.

In at least some examples, when the sink device 106 is present and the CC1 terminal 132 or the CC2 terminal 134 is in the Ra-attached state, the USB cable 104 is an active cable that may contain the e-marker 142 (though is not required to contain the e-marker 142). In at least some examples, when the sink device 106 is present and the CC1 terminal 132 or the CC2 terminal 134 is in the Open state, the USB cable 104 is a passive cable that does not contain the e-marker 142. When the USB PD controller 110 detects the sink device 106 is coupled to the source device 102 via the USB cable 104 when the USB cable 104 is an active cable, the USB PD controller 110 (or the VCONN control circuit 114) provides a signal to the VCONN terminal 138 while the power supply 108 is outputting the voltage having the safe value for the e-marker 142. In other examples, the USB PD controller 110 (or, or via, the VCONN control circuit 114) may provide the signal to the VCONN terminal 138 when the USB cable 104 is a passive cable.

When the USB cable 104 is coupled to the source device 102 via plug 126 and receptacle 124, the USB cable 104, when the USB cable 104 is an active USB cable (e.g., such that the USB cable 104 includes the e-marker 142), loads or pulls down (e.g., such as via an approximately 1 kilo-Ohm resistance) whichever of the CC1 terminal 132 or the CC2 terminal 134 that is coupled to the VCONN terminal 138. Pulling down the one of the CC1 terminal 132 or the CC2 terminal 134 reduces the value of the signal present at the one of the CC1 terminal 132 or the CC2 terminal 134 that is coupled to the VCONN terminal 138 and places that one of the CC1 terminal 132 or the CC2 terminal 134 in the Ra-Attached state.

Similarly, when the source device 102 is coupled to the sink device 106 (e.g., via the USB cable 104 utilizing plug 126 and receptacle 124), the sink device 106 loads or pulls down (e.g., such as via an approximately 5.1 kilo-Ohm resistance) whichever of the CC1 terminal 132 or the CC2 terminal 134 that is coupled to the CC terminal 136. Pulling down the one of the CC1 terminal 132 or the CC2 terminal 134 reduces the value of the signal present at the one of the CC1 terminal 132 or the CC2 terminal 134 that is coupled to the CC terminal 136 and places that one of the CC1 terminal 132 or the CC2 terminal 134 in the Rd-Attached state.

The VCONN control circuit 114 receives the output of the power supply 108 at node 118 and controls transmission of an output on CC2 terminal 134 based on a value of the voltage level of the output of the power supply 108. For example, when the voltage level of the output of the power supply 108 is equal or approximately equal to a voltage specified for activating the e-marker 142 (e.g., such as approximately 5V), the VCONN control circuit 114 couples node 118 to CC2 terminal 134 for transmission to the e-marker 142. In at least some examples, the VCONN control circuit 114 includes a microcontroller (not shown) or other processing element that monitors the value of the output of the power supply 108 present at node 118 and outputs a control signal based on that monitoring to couple node 118 to CC2 terminal 134. In some examples, the microcontroller controls one or more switches (not shown) to couple node 118 to CC2 terminal 134. The switches are each any suitable switching mechanism such as FETs, MOSFETs, BJTs, mechanical switches such as relays, and/or any other suitable switching technology and/or architecture.

In at least some examples, when the USB PD controller 110 detects that the USB cable 104 is an active cable, after providing the signal to the VCONN terminal 138, the USB PD controller 110 (and/or the VCONN control circuit 114) communicates with the USB cable 104 (e.g., such as with the e-marker 142). The USB PD controller 110 communicates with the USB cable 104, in some examples, to determine a maximum current rating of the USB cable 104 and/or other capabilities of the USB cable 104. In at least some examples, communication between the USB PD controller 110 and the USB cable 104 occurs via the one of the CC1 terminal 132 or the CC2 terminal 134 coupled to the CC terminal 136. In yet other examples, the USB PD controller 110 may attempt to communicate with the USB cable 104 without first determining whether the USB cable 104 is an active cable (e.g., such as by detecting the USB cable 104 loading one of the CC1 terminal 132 or the CC2 terminal 134, as discussed above). In such examples, the USB PD controller 110 attempts to communicate with the USB cable 104 via the one of the CC1 terminal 132 or the CC2 terminal 134 coupled to the CC terminal 136. If the USB PD controller 110 receives a response from the USB cable 104, operation proceed as further discussed herein. If the USB cable 104 does not respond, in some examples, the USB PD controller 110 proceeds under the assumption that the USB cable 104 is a passive cable and assumes default and/or predefined capabilities of the USB cable 104.

After the USB PD controller 110 communicates (or attempts to communicate) with the USB cable 104, in some examples the USB controller 110 begins communication with the sink device 106. In some examples, this communication causes, directly or indirectly, the value of the signal present at node 118 to increase (or attempt to increase) beyond the safe value for the e-marker 142. Accordingly, in at least some examples, while node 118 is coupled to CC2 terminal 134, the USB PD controller 110 and/or the VCONN control circuit 114 prevents communication from the source device 102 to the sink device 106 (e.g., communication, such as (but not limited to) over the CC terminal that may involve or otherwise cause a change or variation in the value of the signal present at node 118 and output via the VBUS terminal 122). In other examples, while node 118 is coupled to CC2 terminal 134, the USB PD controller 110 and/or the VCONN control circuit 114 limits transmissions from the source device 102 to the sink device 106 via the VBUS terminal 122 to transmissions occurring with a voltage value approximately equal to the voltage specified for activating the e-marker 142. In some examples, the USB PD controller 110 and/or the VCONN control circuit 114 decouples node 118 from CC2 terminal 134 when the signal present at node 118 increases beyond the safe value for the e-marker 142. In yet other examples, the source device 102 includes a voltage regulator (not shown) such as a low-dropout regulator (LDO) coupled between the node 118 and the VCONN terminal 138 such that a maximum value of the voltage provided to the VCONN terminal 138 is limited by the voltage regulator without regard to the value of the signal present at node 118. In some examples, the USB PD controller 110 causes a value of the signal present at node 118 to increase. For example, the sink device 106 may request that the source device 102 (e.g., via communication received via the USB PD controller 110) provide a signal at node 118 (and therefore the VBUS terminal 122) having a value greater than that of a currently provided signal. In response, the USB controller 110 controls the voltage control circuit 112 (or, alternatively, directly controls the power supply 108) to modify a value of the output of the power supply 108 provided to the node 118. The USB PD controller 110, in some examples, controls the voltage control circuit 112 based at least partially on generating and providing VREF to the voltage control circuit 112.

While discussed herein and illustrated in FIG. 1 as the CC1 terminal 132 being configured to couple to the CC terminal 136 and the CC2 terminal 134 being configured to couple to the VCONN terminal 138, in some examples the couplings may be reversed. For example, at least some USB cables 104 may be reversible such that, depending on an orientation with which the plug 126 is inserted into the receptacle 124, the CC1 terminal 132 is configured to couple to one of the CC terminal 136 or the VCONN terminal 138 and the CC2 terminal 134 is configured to couple to the other of the CC terminal 136 or the VCONN terminal 138. Thus, while couplings associated with one orientation of insertion of the plug 126 into the receptacle 124 are described herein, couplings associated with any orientation of insertion of the plug 126 into the receptacle 124 are contemplated herein and encompassed within the scope of the present disclosure. Accordingly, in at least some examples, the USB PD controller 110 is further configured to detect and/or determine which of CC1 terminal 132 or CC2 terminal 134 is coupled to the VCONN terminal 138 (or to the CC terminal 136) to determine which of CC1 terminal 132 or CC2 terminal 134 to couple to node 118.

Figure 2:
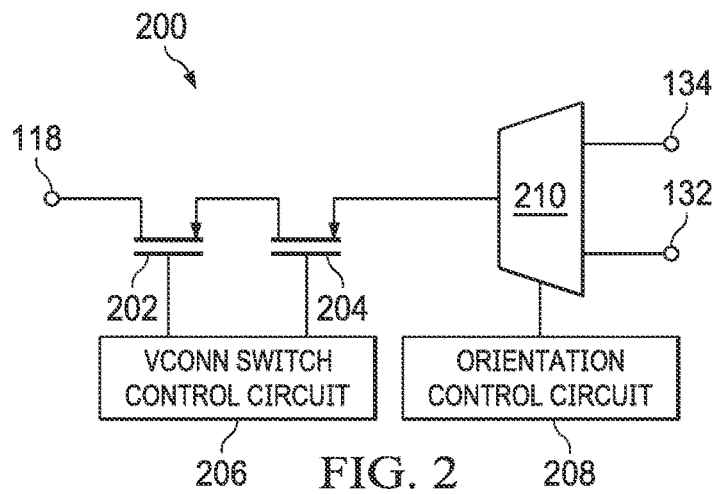
FIG. 2 shows a schematic diagram of an illustrative circuit in accordance with various examples.

Referring now to FIG. 2, a schematic diagram of a circuit 200 is shown. In at least one example, the circuit 200 is suitable for implementation as the VCONN control circuit 114 of FIG. 1, and reference is made to elements of FIG. 1 with respect to the couplings of circuit 200. In at least one example, the circuit 200 includes a switch 202, a switch 204, a VCONN switch control circuit 206, an orientation control circuit 208, and a de-multiplexer 210. The switch 202 and the switch 204 are each any suitable switching mechanism such as FETs, MOSFETs, BJTs, mechanical switches such as relays, and/or any other suitable switching technology and/or architecture capable of supporting a maximum output voltage value of the power supply 108, such as the maximum voltage value that would be present at the node 108. In at least one example, the VCONN switch control circuit 206 is implemented as, or by, any suitable processing element (such as a microprocessor) capable of performing the operations disclosed herein. In at least one example, the orientation control circuit 208 is implemented as, or by, any suitable processing element (such as a microprocessor) capable of performing the operations disclosed herein. In some examples, both the VCONN switch control circuit 206 and the orientation control circuit 208 are implemented by the same processing element. In some examples, one or both of the VCONN switch control circuit 206 and/or the orientation control circuit 208 are implemented by the USB PD controller 110 of FIG. 1 (e.g., such that the USB PD controller 110 and the VCONN switch control circuit 206 and/or the orientation control circuit 208 are implemented in the same microcontroller or processing element).

In one example architecture of the circuit 200, a first terminal of the switch 202 is coupled to the node 118 of FIG. 1 and a second terminal of the switch 202 is coupled to a first terminal of the switch 204. A second terminal of the switch 204 is coupled to an input of the de-multiplexer 210. A first output of the VCONN switch control circuit 206 is coupled to a control terminal of the switch 202 and a second output of the VCONN switch control circuit 206 is coupled to a control terminal of the switch 204. An output of the orientation control circuit 208 is coupled to a selection input of the de-multiplexer 210.

In an example of operation of the circuit 200, the VCONN switch control circuit 206 monitors the CC1 terminal 132 and the CC2 terminal 134 to determine whether the sink device 106 is coupled to the source device 102. When the sink device 106 is coupled to the source device 102, in some examples, the VCONN control circuit 206 generates a first control signal for controlling the switch 202 and generates a second control signal for controlling the switch 204. In at least some examples, control of the switch 202 and the switch 204 is further based on a value of the signal present at node 118 and, when the value of the signal present at node 118 is equal or approximately equal to a voltage specified for activating the e-marker 142, the switch 202 and the switch 204 are controlled to turn on. For example, the signal present at node 118 may be compared to a threshold value and the switch 202 and the switch 204 may be controlled to turn on or off based on both a result of the comparison (e.g., such as a an output of a comparator (not shown)) and the first control signal and second control signal, respectively, output by the VCONN switch control circuit 206.

Additionally, the orientation control circuit 208 monitors the CC1 terminal 132 and the CC2 terminal 134 to determine an orientation of insertion of the plug 126 into the receptacle 124, each of FIG. 1, and generates a selection control signal for controlling the de-multiplexer 210. For example, the orientation control circuit 208 monitors the CC1 terminal 132 and the CC2 terminal 134 to determine whether the sink device 106 has been coupled to the source device 102 via the USB cable 104 and the orientation of insertion of the plug 126 into the receptacle 124 based on the sink device 106 being coupled to the source device 102 via the USB cable 104. In at least some examples, the orientation control circuit 208 determines the orientation of insertion of the plug 126 into the receptacle 124 based on a value of a signal present at CC1 terminal 132 and/or the CC2 terminal 134, for example, based on loading of the CC1 terminal 132 and/or the CC2 terminal 134 as discussed above with respect to FIG. 1. By determining an amount of loading of the CC1 terminal 132 or the CC2 terminal 134, the orientation control circuit 208 determines the orientation of insertion of the plug 126 into the receptacle 124 and which of the CC1 terminal 132 or the CC2 terminal 134 is coupled to the VCONN terminal 138. Based on the orientation of insertion of the plug 126 into the receptacle 124 and which of the CC1 terminal 132 or the CC2 terminal 134 is coupled to the VCONN terminal 138, the orientation control circuit 208 generates a selection control signal and provides the selection control input to the selection input of the de-multiplexer 210 to control output by the de-multiplexer 210. For example, when the orientation control circuit 208 provides the de-multiplexer 210 with a selection control signal having a value of zero, the de-multiplexer 210 provides the signal received at the input terminal of the de-multiplexer 210 to the CC2 terminal 134. Similarly, when the orientation control circuit 208 provides the de-multiplexer 210 with a selection control signal having a value of one, the de-multiplexer 210 provides the signal received at the input terminal of the de-multiplexer 210 to the CC1 terminal 132.

Figure 3:
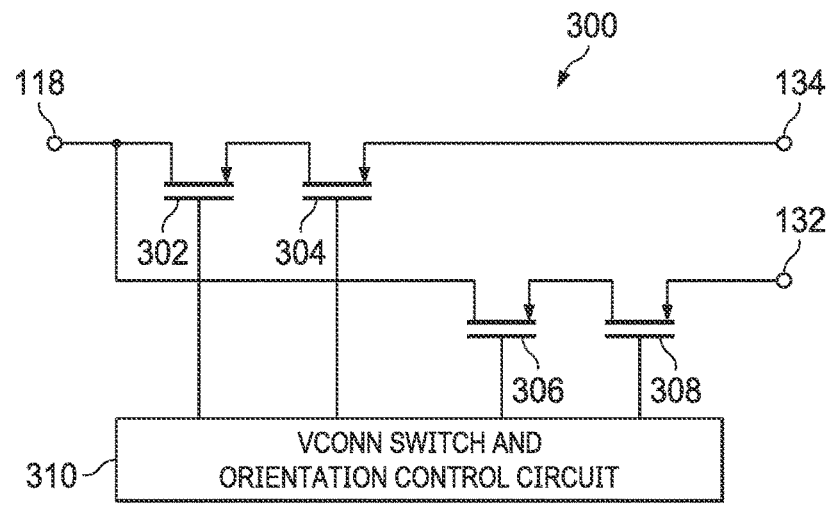
FIG. 3 shows a schematic diagram of an illustrative circuit in accordance with various examples.

Referring now to FIG. 3, a schematic diagram of a circuit 300 is shown. In at least one example, the circuit 300 is suitable for implementation as the VCONN control circuit 114 of FIG. 1, and reference is made to elements of FIG. 1 with respect to the couplings of circuit 300. In at least one example, the circuit 300 includes a switch 302, a switch 304, a switch 306, a switch 308, and a VCONN switch and orientation control circuit 310. The switch 302, switch 304, switch 306, and switch 308 are each any suitable switching mechanism such as FETs, MOSFETs, BJTs, mechanical switches such as relays, and/or any other suitable switching technology and/or architecture capable of supporting a maximum output voltage value of the power supply 108, such as the maximum voltage value that would be present at the node 108. In at least one example, the VCONN switch and orientation control circuit 310 is implemented as, or by, any suitable processing element (such as a microprocessor) capable of performing the operations disclosed herein. In some examples, at least some aspects of the VCONN switch and orientation control circuit 310 are implemented by the USB PD controller 110 of FIG. 1 (e.g., such that the USB PD controller 110 and the VCONN switch and orientation control circuit 310 are implemented in the same microcontroller or processing element). In some examples, the VCONN switch and orientation control circuit 310 is implemented as multiple separate circuits configured to couple together.

In one example architecture of the circuit 300, a first terminal of the switch 302 is coupled to the node 118 of FIG. 1 and a second terminal of the switch 302 is coupled to a first terminal of the switch 304. A second terminal of the switch 304 is coupled to the CC2 terminal 134. A first terminal of the switch 306 is coupled to the node 118 and a second terminal of the switch 306 is coupled to a first terminal of the switch 308. A second terminal of the switch 308 is coupled to the CC1 terminal 132. A first output of the VCONN switch and orientation control circuit 310 is coupled to a control terminal of the switch 302, a second output of the VCONN switch and orientation control circuit 310 is coupled to a control terminal of the switch 304, a third output of the VCONN switch and orientation control circuit 310 is coupled to a control terminal of the switch 306, and a fourth output of the VCONN switch and orientation control circuit 310 is coupled to a control terminal of the switch 308.

In an example of operation of the circuit 300, the VCONN switch and orientation control circuit 310 monitors a value of the signal present at node 118 and, based at least partially on the value of the signal present at node 118 being equal, or approximately equal, to a voltage specified for activating the e-marker 142, generates control signals for controlling at least some of the switch 302, switch 304, switch 306, and/or switch 308. In some examples, the control signals control at least some of the switch 302, switch 304, switch 306, and/or switch 308 to turn on (e.g., conduct current), such as when the value of the signal present at node 118 being equal, or approximately equal, to the voltage specified for activating the e-marker 142. In other examples, the controls signals control at least some of the switch 302, switch 304, switch 306, and/or switch 308 to turn off (e.g., not conduct current), such as when the value of the signal present at node 118 is not equal, or approximately equal, to the voltage specified for activating the e-marker 142. Additionally, the VCONN switch and orientation control circuit 310 monitors the CC1 terminal 132 and the CC2 terminal 134 to determine an orientation of insertion of the plug 126 into the receptacle 124, each of FIG. 1, and further generates the control signals for controlling at least some of the switch 302, switch 304, switch 306, and/or switch 308 based at least partially on the determined orientation of insertion of the plug 126 into the receptacle 124. For example, the VCONN switch and orientation control circuit 310 monitors the CC1 terminal 132 and the CC2 terminal 134 to determine whether the sink device 106 has been coupled to the source device 102 via the USB cable 104 and the orientation of insertion of the plug 126 into the receptacle 124 in a manner substantially similar to that of the orientation control circuit 208, discussed above with reference to FIG. 2, the description of which is not repeated herein. Based on the orientation of insertion of the plug 126 into the receptacle 124, and which of the CC1 terminal 132 or the CC2 terminal 134 is coupled to the VCONN terminal 138, the orientation control circuit 310 generates one or more control signals and provides the control signal(s) to switch 302 and switch 304 or to switch 306 and 308, for example, to couple node 118 to the VCONN terminal 138. For example, when the orientation control circuit 310 sends an enable signal to switch 302 and switch 304, node 118 is coupled to the CC2 terminal 134 and the orientation control circuit 310 also sends a disable signal to switch 306 and switch 308 to prevent coupling node 118 to the CC1 terminal 132. Similarly, when the orientation control circuit 310 sends an enable signal to switch 306 and switch 308 such that node 118 is coupled to the CC1 terminal 132 and the orientation control circuit 310 sends a disable signal to switch 302 and switch 304 to prevent coupling node 118 to CC2 terminal 134.

Figure 4:
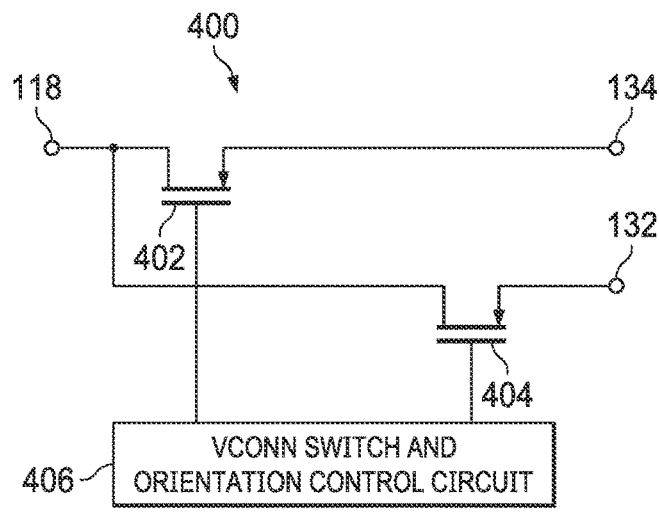
FIG. 4 shows a schematic diagram of an illustrative circuit in accordance with various examples.

Referring now to FIG. 4, a schematic diagram of a circuit 400 is shown. In at least one example, the circuit 400 is suitable for implementation as the VCONN control circuit 114 of FIG. 1, and reference is made to elements of FIG. 1 with respect to the couplings of circuit 400. In at least one example, the circuit 400 includes a switch 402, a switch 404, and a VCONN switch and orientation control circuit 406. The switch 404 and the switch 204 are each any suitable switching mechanism such as FETs, MOSFETs, BJTs, mechanical switches such as relays, and/or any other suitable switching technology and/or architecture capable of supporting a maximum output voltage value of the power supply 108, such as the maximum voltage value that would be present at the node 108. In at least one example, the VCONN switch and orientation control circuit 406 is implemented as, or by, any suitable processing element (such as a microprocessor) capable of performing the operations disclosed herein. In some examples, at least some aspects of the VCONN switch and orientation control circuit 406 are implemented by the USB PD controller 110 of FIG. 1 (e.g., such that the USB PD controller 110 and the VCONN switch and orientation control circuit 406 are implemented in the same microcontroller or processing element). In some examples, the VCONN switch and orientation control circuit 406 is implemented as multiple separate circuits configured to couple together.

In one example architecture of the circuit 400, a first terminal (e.g., drain terminal) of the switch 402 is coupled to the node 118 of FIG. 1 and a second terminal (e.g., source terminal) of the switch 402 is coupled to the CC2 terminal 134. A first terminal (e.g., drain terminal) of the switch 404 (for example the drain) is coupled to the node 118 and a second terminal (e.g., source terminal) of the switch 306 is coupled to the CC1 terminal 132. A first output of the VCONN switch and orientation control circuit 406 is coupled to a control terminal (e.g., gate terminal) of the switch 402 and a second output of the VCONN switch and orientation control circuit 406 is coupled to a control terminal (e.g., gate terminal) of the switch 404.

In an example of operation of the circuit 400, the VCONN switch and orientation control circuit 406 monitors a value of the signal present at node 118 and, based at least partially on the value of the signal present at node 118 being equal or approximately equal to a voltage specified for activating the e-marker 142, generates control signals for controlling at least one of the switch 402 or the switch 404. Additionally, the VCONN switch and orientation control circuit 406 monitors the CC1 terminal 132 and the CC2 terminal 134 to determine an orientation of insertion of the plug 126 into the receptacle 124, each of FIG. 1, and further generates the control signals for controlling at least some of the switch 402 or the switch 404 based at least partially on the determined orientation of insertion of the plug 126 into the receptacle 124. For example, the VCONN switch and orientation control circuit 406 monitors the CC1 terminal 132 and the CC2 terminal 134 to determine whether the sink device 106 has been coupled to the source device 102 via the USB cable 104 and the orientation of insertion of the plug 126 into the receptacle 124 in a manner substantially similar to that of the orientation control circuit 208, discussed above with reference to FIG. 2, the description of which is not repeated herein. Based on the orientation of insertion of the plug 126 into the receptacle 124, and which of the CC1 terminal 132 or the CC2 terminal 134 is coupled to the VCONN terminal 138, the VCONN switch and orientation control circuit 406 generates one or more control signals and provides the control signal(s) to either switch 402 or switch 404 to couple 118 to VCONN 138. For example, when the VCONN switch and orientation control circuit 406 sends an enable signal to switch 402, node 118 is coupled to the CC2 terminal 134 and the VCONN switch and orientation control circuit 406 sends a disable signal to switch 404 to prevent coupling node 118 to CC1 terminal 132. Similarly, when the VCONN switch and orientation control circuit 406 sends an enable signal to switch 404, node 118 is coupled to the CC1 terminal 132 and the VCONN switch and orientation control circuit 406 sends a disable signal to switch 402 to prevent coupling node 118 to CC2 terminal 134. In some examples, the circuit 400 consumes less power and has a reduced size when compared to the circuit 300, for example, because the circuit 400 includes fewer switches. In some examples of circuit 400, node 118 is maintained at a voltage sufficiently higher than a voltage of the CC2 terminal 134 when the switch 402 is disabled to prevent current from flowing in the reverse direction. Similarly, in some examples, node 118 is maintained at a voltage sufficiently higher than a voltage of the CC1 terminal 132 when the switch 404 is disabled to prevent current from flowing in the reverse direction.

Figure 5:
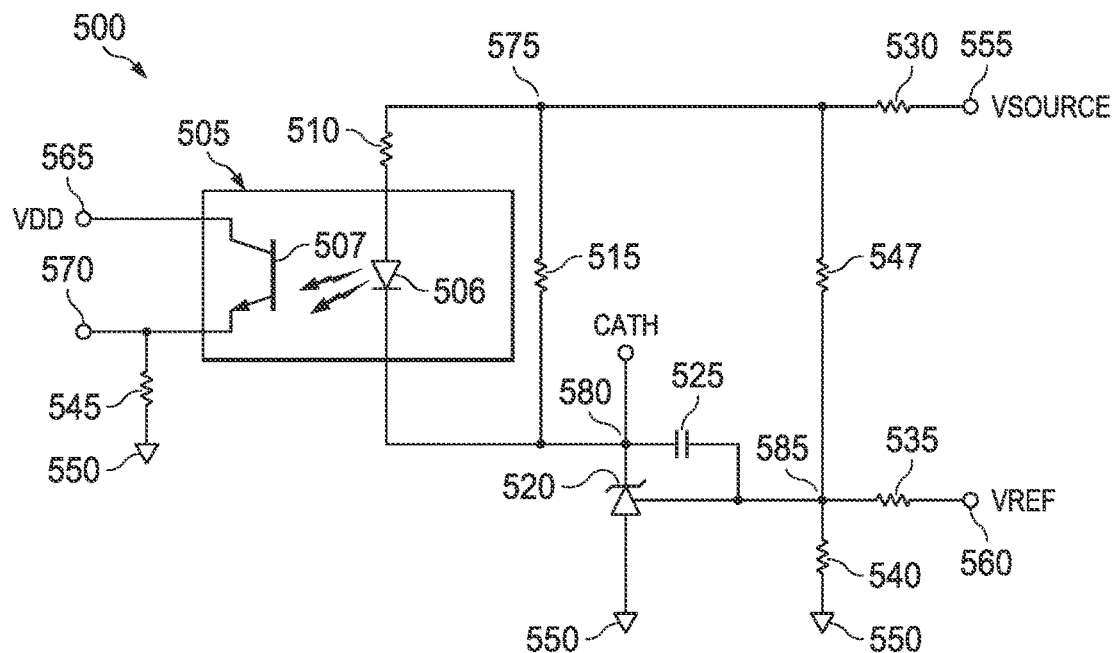
FIG. 5 shows a schematic diagram of an illustrative circuit in accordance with various examples.

Referring now to FIG. 5, a schematic diagram of a circuit 500 is shown. In at least one example, the circuit 500 is suitable for implementation as the voltage control circuit 112 of FIG. 1, and reference is made to elements of FIG. 1 with respect to the couplings of circuit 500. In at least one example, the circuit 500 includes an optocoupler 505 (that includes a light emitting diode 506 and a photo-sensor 507), resistors 510, 515, 530, 535, 540, 545, and 547, a shunt regulator 520, and a capacitor 525. In some examples, at least some aspects of the circuit 500 are implemented in other devices. For example, at least some components of the circuit 500, when implemented as the voltage control circuit 112, may be implemented in the USB PD controller 110. Additionally, in various examples, at least some components of circuit 500 (e.g., the resistor 535) may be omitted or additional components not shown may be added to the circuit 500 to support the functionality described herein.

In at least one example architecture of circuit 500, the optocoupler 505 has a first terminal coupled to a node 565 and configured to receive a voltage VDD used in generating an output of a power supply, a second terminal coupled to node 570, a third terminal coupled to node 575 via resistor 510, and a fourth terminal coupled to node 580. The resistor 515 is coupled between node 575 and node 580. The shunt regulator 520 has a cathode coupled to node 580, an anode coupled to a ground voltage potential 550, and a control input coupled to node 585. The capacitor 525 is coupled between node 580 and node 585. The resistor 530 is coupled between node 555 and node 575, the resistor 535 is coupled between node 560 and node 585, the resistor 540 is coupled between node 585 and the ground voltage potential 550, the resistor 545 is coupled between node 570 and the ground voltage potential 550, and the resistor 547 is coupled between node 575 and node 585. In some examples, the circuit 500 is configured to receive a power supply output (VSOURCE) at node 555 (e.g., such that node 555 corresponds to node 118 of FIG. 1), receive VREF at node 560, receive CATH at node 580, and couple to a control input of the power supply (e.g., the power supply 108 of FIG. 1) at node 570.

In an example of operation of the circuit 500, the shunt regulator 520 converts a voltage present at node 585 to a proportional current that drives a brightness of the light emitting diode 506 of the optocoupler 505. The light emitted by the light emitting diode 506 is converted back to a proportional voltage by the photo-sensor 507, thereby approximately providing a proportional voltage at node 570 to the voltage present at node 585. When node 560 is floating, the resistor 547 and resistor 540 create a voltage divider that establishes a voltage present at node 585 as proportional to a voltage present at node 555. When current is sunk from node 560, the change in voltage at node 585 that is conveyed by the shunt regulator 520 and optocoupler 505 to node 570 causes a value of VSOURCE to change proportional to a value of the current sunk from node 560.

Figure 6:
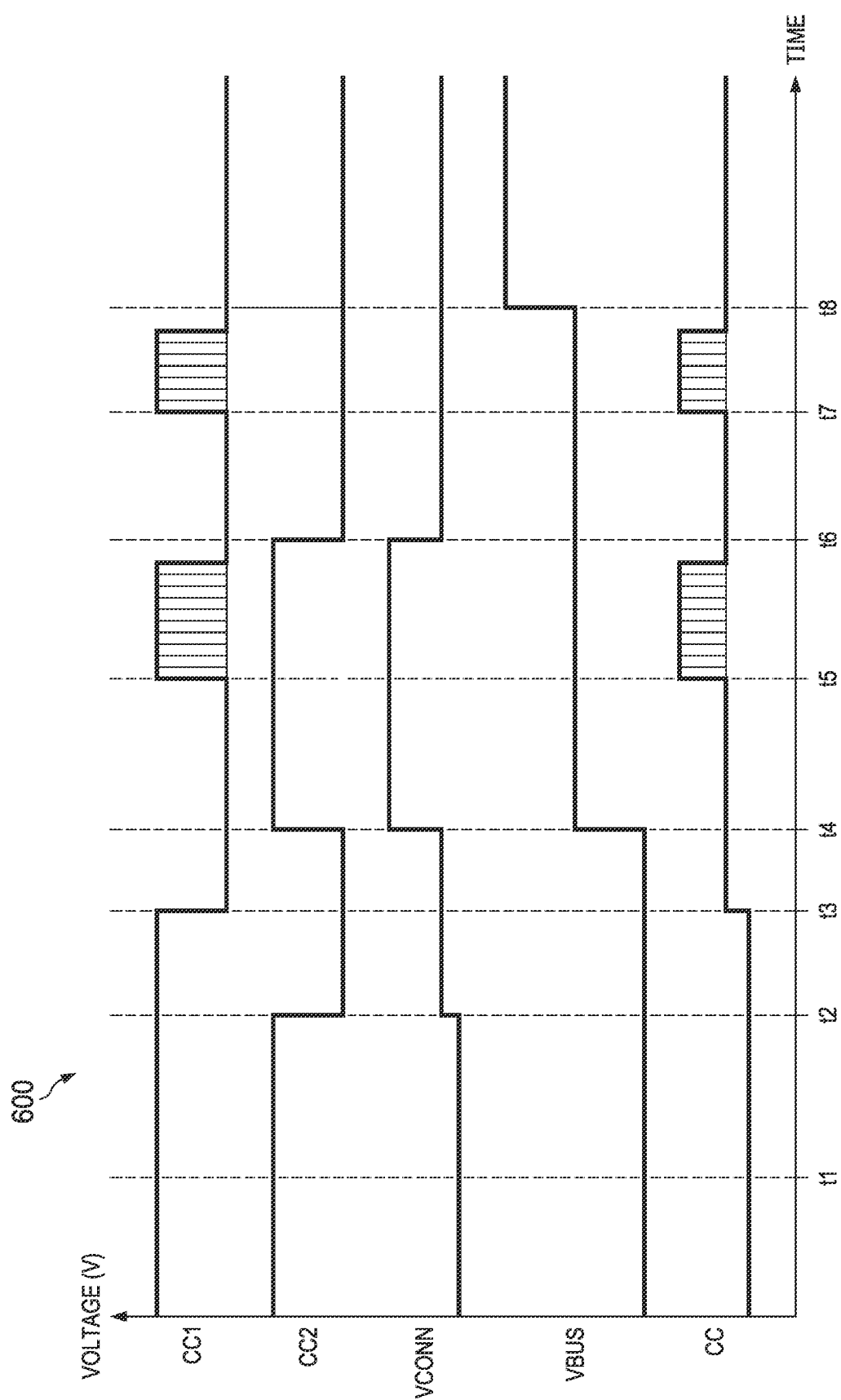
FIG. 6 shows a timing diagram of illustrative signals in accordance with various examples.

Referring now to FIG. 6, a timing diagram 600 of illustrative signals in accordance with various examples is shown. The signals of diagram 600 are illustrative of operation of at least one exemplary implementation of the system 100, discussed above with respect to FIG. 1. For example, at least some signals of the diagram 600 may be generate, monitored, and/or otherwise associated with at least one of the USB PD controller 110 and/or the VCONN control circuit 114. Illustrated in FIG. 6 are a CC1 signal indicating a value of a signal present at CC1 terminal 132, a CC2 signal indicating a value of a signal present at the CC2 terminal 134, a VCONN signal indicating a value of a signal present at VCONN terminal 138, a VBUS signal indicating a value of a signal output by the system 100 via the VBUS terminal 122, and a CC signal indicating a value of a signal present at the CC terminal 136. Each signal of the diagram 600 is representative in a vertical direction of voltage and representative in a horizontal direction of time.

As shown in diagram 600, at a time t1, the CC1 terminal 132 and the CC2 terminal 143 are in an open state, representing a pull-up voltage applied to the CC1 terminal 132 and the CC2 terminal 143, for example, by the USB PD controller 110 and/or the VCONN control circuit 114. Also at the time t1, the VBUS terminal 122, CC terminal 136, and VCONN terminal 138 are each representative of a low signal (e.g., approximately zero) because the USB cable 104 is not coupled to the source device 102 at time t1.

At a time t2, the USB cable 104 is coupled to the source device 102, loading the CC2 terminal 134 and reducing the value of the signal present at the CC2 terminal 134. At a time t3, the sink device 106 is coupled to the USB cable 104 (and thereby the source device 102), loading the CC1 terminal 132 and reducing the value of the signal present at the CC1 terminal 132. While discussed for the sake of simplicity of description with reference to diagram 600 as the USB cable 104 loading the CC2 terminal 134 and the sink device 106 loading the CC1 terminal 132, the inverse may also occur, for example, based on an orientation of insertion of plug 126 into receptacle 124, as discussed above with reference to the preceding figures. Additionally, while time t2 and time t3 are discussed and illustrated as occurring sequentially, in some examples time t2 and time t3 may occur consecutively, such as when the USB cable 104 is coupled to the sink device 106 prior to coupling the USB cable 104 to the source device 102.

At a time t4, a voltage is applied to the VBUS terminal 122 and the CC2 terminal 134 (and therefore the VCONN terminal 138), for example, to facilitate communication with the e-marker 142. The voltage is applied by one or more of the USB PD controller 110 and/or the VCONN control circuit 114, for example, as described above with reference to the preceding figures. A value of the voltage is, for example, a safe value for the e-marker 142 (e.g., equal or approximately equal to a value specified for activating the e-marker 142). Additionally, although not shown in diagram 600, in some examples a delay may exist between application of the voltage to the VBUS terminal 122 and the CC2 terminal 134 such that one of the VBUS terminal 122 or the CC2 terminal 134 receives the applied voltage before the other of the VBUS terminal 122 or the CC2 terminal 134.

At a time t5, communication occurs between the USB PD controller 110 and the e-marker 142 via the CC1 terminal 134 and the CC terminal 136. The communication, in some examples, includes one or more start of packet (SOP) messages sent from the USB PD controller 110 to e-marker 142 and/or one or more SOP messages sent from the e-marker 142 to the USB PD controller 110, for example, such that the USB PD controller 110 determines capabilities of the e-marker 142. While t5 is illustrated in FIG. 6 as occurring subsequent to t4, in some examples, t5 may occur substantially simultaneously with, or before, t4.

At a time t6, occurring subsequent to an end of the communication begun at time t5, the voltage applied at time t4 is removed from the CC2 terminal 134 and therefore from the VCONN terminal 138. The voltage is removed by one or more of the USB PD controller 110 and/or the VCONN control circuit 114, for example, as described above with reference to the preceding figures.

At a time t7, communication occurs between the USB PD controller 110 and the sink device 106 via the CC1 terminal 134 and the CC terminal 136. The communication, in some examples, includes one or more SOP messages sent from the USB PD controller 110 to the sink device 106 and/or one or more SOP messages sent from the sink device 106 to the USB PD controller 110. The SOP messages include, in various examples, Source Capabilities messages, Request messages, and/or Accept messages, as discussed herein. While t7 is illustrated in FIG. 6 as occurring subsequent to t6, in some examples, t7 may occur substantially simultaneously with t6.

At a time t8, a voltage having a value greater than the safe value for the e-marker 142 is applied to the VBUS terminal 122, for example, subsequent to, or to facilitate, communication with the sink device 106 (such as a result of SOP messages received from the sink device 106 requesting an increase to the value of the voltage provided to the VBUS terminal 122) and/or transmission of power to (e.g., charging of) the sink device 106 (e.g., via the VBUS terminal 122). The voltage is applied, in some examples, by the USB PD controller 110, for example, as described above with reference to the preceding figures. In some examples, t6 and t8 occur substantially simultaneously such that, the VCONN control circuit 114 decouples the node 118 from the CC2 terminal 134 (and therefore the VCONN terminal 138) when the voltage at node 118 rises above a pre-defined value, such as the safe value for the e-marker 142.

In at least some examples, the signals represented in FIG. 6 are not scaled to a same voltage value but the signals CC2 and VCONN have substantially a same value beginning at the time t2 and the signals CC1 and CC have substantially a same value beginning at the time t3.

Figure 7:
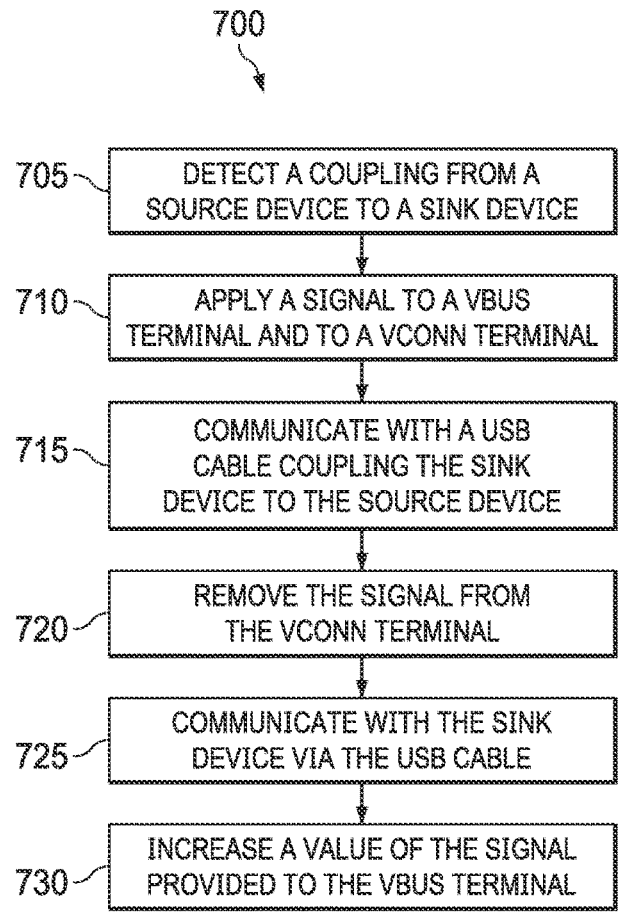
FIG. 7 shows a flowchart of an illustrative method in accordance with various examples.

Referring now to FIG. 7, a flowchart of an illustrative method 700 in accordance with various examples is shown. In some embodiments, the method 700 illustrates a VCONN output method. Accordingly, in at least some examples, at least some aspects of the method 700 are implemented by a controller such as a USB PD controller (e.g., the USB PD controller 110 of FIG. 1) and/or a VCONN control circuit such as any of the VCONN control circuits 114 of FIG. 1, circuit 200 of FIG. 2, circuit 300 of FIG. 3, or circuit 400 of FIG. 4.

At operation 705, the controller detects a coupling from a sink device to a source device. The controller detects the connection from the sink device, in at least some examples, by detecting the sink device loading at least one terminal coupled to the controller (e.g., via a coupling utilizing a USB cable). In some examples, the detections are at least partially performed by a processing element (e.g., such as a microcontroller) monitoring one or more terminals coupled to the controller and determining that one of the one or more terminals is being loaded by the sink device based on one or more comparisons of values present at, or viewed from, the one or more terminals by the processing element to known or expected values (e.g., such as one or more threshold values), as described in greater detail above with respect to FIG. 1.

At operation 710, the controller applies a signal to a VBUS terminal coupled to the controller and a VCONN terminal coupled to the controller. The controller applies the signal to the VBUS terminal and the VCONN terminal, in some examples, by controlling one or more switches to establish couplings between respective terminals of the switches to establish a path between a power supply and the VBUS terminal and between the power supply and the VCONN terminal. In at least some examples, each of the switches is a transistor. In some examples, to apply the signal to the VBUS terminal, the controller generates and provides to one of the switches, a control signal having a value sufficient to cause the switch to conduct current between respective terminals of the switch. In some examples, to apply the signal to the VCONN terminal, the controller generates at least one additional control signal and provides the control signal to another of the switches. The control signal is, for example, a signal having a value sufficient to cause the switch to conduct current between respective terminals of the switch. In at least one example, prior to applying the signal to the VCONN terminal, the controller determines whether a predefined amount of resistance is present at a node coupled to the VCONN terminal (e.g., such as a desired amount of resistance in a pull-down resistor coupled to the node shared with the VCONN terminal). In some examples, the controller outputs a reference value to control the voltage level of the signal. In some examples, the controller further determines which terminal coupled to the controller is the VCONN terminal based at least partially on the loading determined and/or detected at operation 705.

At operation 715, the controller communicates with the USB cable coupling the sink device to the source device. The controller communicates with the USB cable, in one example to interrogate or query the USB cable to determine capabilities and/or specifications of the USB cable. In at least one example, the controller communicates with an e-marker of the USB cable, where the e-marker is powered via the signal applied to the VCONN terminal. In at least some examples, the controller limits the value of the signal applied to the VCONN terminal to a safe value for the e-marker (e.g., equal or approximately equal to a voltage specified for activating the e-marker). In some examples, the controller communicates with the e-marker of the USB cable at least via a SOP message having a first or a second format (e.g., a SOP' message or a SOP" message) to determine capabilities, specifications, and/or limitations of the USB cable.

At operation 720, after communicating with the USB cable and/or determining the capabilities, specifications, and/or limitations of the USB cable the controller removes the signal from the VCONN terminal, thereby removing the power source from the e-marker. In some examples, to remove the signal from the VCONN terminal, the controller generates at least one control signal and provides the control signal to one of the switches, where the signal does not have a value sufficient to cause the switch to conduct current between respective terminals of the switch.

At operation 725, the controller communicates with the sink device via the USB cable, at least partially according to the determined capabilities, specifications, and/or limitations of the USB cable. In some examples, to communicate with the sink device, the controller transmits one or more SOP messages having a third format (e.g., a SOP message) to the sink device via the USB cable. In some examples, operation 725 may be performed prior to, or concurrently with, operation 720. In such examples, the controller prevents the signal provided to the VBUS terminal and the VCONN terminal from exceeding the safe value for the e-marker until the signal is removed from the VCONN terminal. In some examples, the controller limits the signal from exceeding the safe value for the e-marker by advertising a source capability to the sink device that specifies a capability of communicating a value approximately equal to, or less than, the safe value for the e-marker while the signal is applied to the VCONN terminal.

In some examples, when the controller communicates with the sink device via the USB cable (e.g., via a CC terminal of the USB cable), the controller transmits digital messages formed into packets. For example, the controller may send a Source Capabilities SOP message that indicates one or more voltage values that the source device is capable of outputting (e.g., via a power supply of, or coupled to, the source device). The controller may further indicate in the Source Capabilities SOP message, an amount of current that the source device is capable of providing for each voltage. When the sink device receives the Source Capabilities SOP message, the sink device may select a preferred voltage value and send a Request SOP message to the source device requesting the preferred voltage value at a preferred current. In some examples, the source device sends an Accept SOP message to the sink device and proceeds to control the power supply to output the preferred voltage value at the preferred current and provide the preferred voltage value to the sink device via the VBUS terminal. In other examples, the source device indicates a maximum providable voltage value and a minimum providable voltage value in the Source Capabilities SOP message and the sink device indicates a specific voltage within that range in its Request SOP message.

In some examples, the source device (e.g., via the controller) restricts the voltage values indicated in the Source Capabilities SOP message. For example, prior to communicating with the cable, the source device may limit the voltage values indicated in the Source Capabilities SOP message to those which are also safe values (e.g., safe voltage values for the e-marker of the USB cable) that can be coupled to the VCONN terminal. Once communication between the source device (e.g., the controller) and the USB cable has ceased and the VCONN terminal is decoupled from the power supply output, the source device may remove the limitations on the voltage values offered to the sink device (e.g., as indicated in the Source Capabilities SOP message). In some examples, the source device removes the limitations by the controller retransmitting the Source Capabilities SOP message indicating all voltage values that the power supply is capable of generating, including those voltage values that would be unsafe for the USB cable (e.g., the e-marker) if the power supply output was still coupled to the VCONN terminal.

At operation 730, the controller increases a value of the signal provided to the VBUS terminal beyond the safe value for the e-marker and based at least partially on the determined capabilities, specifications, and/or limitations of the USB cable. In at least some examples, such as USB-C cables, the controller increases the value of the signal provided to the VBUS terminal to greater than 5V, greater than 5.5V, greater than 10V, greater than 15V, approximately 20V, or greater than 20V, the scope of which is not limited herein. The controller increases the value of the signal provided to the VBUS terminal, in some examples, by varying a value of a reference voltage (e.g., VREF) on which the value of the signal provided to the VBUS terminal is at least partially based. The reference voltage is provided, in some examples, to a circuit configured to control or modify an output of a power supply, while in other examples the reference voltage is provided to the power supply.

While the operations of the method 700 have been discussed and labeled with numerical reference, the method 700 may include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure.

In the foregoing discussion, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., FET, MOSFET, n-type, p-type, etc.), these components may be exchanged for components of other process technologies (e.g., replace FETE and/or MOSFET with bi-polar junction transistor (BJT), replace n-type with p-type or vice versa, etc.) and reconfiguring circuits including the replaced components to provide desired functionality at least partially similar to functionality available prior to the component replacement. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A process comprising:
   detecting, by a controller, a coupling from a sink device to a source device;
   applying, by the controller, signals to a bus voltage (VBUS) terminal and a connector voltage (VCONN) terminal of a cable performing the coupling;
   communicating, by the controller, with the cable performing the coupling to determine characteristics of the cable;
   removing, by the controller, the signal from the VCONN terminal;
   communicating, by the controller, with the sink device according to the characteristics of the cable; and
   increasing, by the controller, a value of the signal provided to the VBUS terminal beyond an acceptable limit for providing to the VCONN terminal.

2. The process of claim 1 in which the acceptable limit for providing to the VCONN terminal is a voltage specified for activating an electronic marker of the cable.

3. The process of claim 1 in which applying the signal to the VBUS terminal and the VCONN terminal of the cable includes generating one or more switch control signals and controlling one or more switches according to the one or more switch control signals.

4. The process of claim 1 including preventing, by the controller, communication of a signal having a value beyond the acceptable limit for providing to the VCONN terminal to the sink device via the cable while the signal is applied to the VBUS terminal and the VCONN terminal.

5. A process of operating a Universal Serial Bus Power Delivery source device comprising:
   detecting in a controller coupling of a sink device to receptacle terminals of the source device with a cable that contains an e-marker device;
   coupling e-marker device communication voltages from a power source to a bus voltage (VBUS) terminal and a connector voltage (VCONN) terminal of the receptacle;
   communicating between the controller and the e-marker device for determining characteristics of the cable;
   removing the voltage from the VCONN terminal after the determining;
   communicating between the controller and the sink device according to the characteristics of the cable; and
   increasing a value of the voltages provided to the VBUS terminal beyond an acceptable limit for providing voltages to the VCONN terminal.

6. The process of claim 5 in which the acceptable limit for providing voltage to the VCONN terminal is a voltage specified for activating the e-marker of the cable.

7. The process of claim 5 in which the coupling voltages to the VBUS terminal and the VCONN terminal of the cable includes generating one or more switch control signals and controlling one or more switches according to the one or more switch control signals.

8. The process of claim 5 including preventing communication to the sink device via the cable while the e-marker device communication voltages are applied to the VBUS terminal and the VCONN terminal.

9. The process of claim 5 in which the coupling includes adjusting a voltage from the power supply.

10. The process of claim 5 in which the coupling includes adjusting a voltage from the power supply in response to a control signal from the controller.

11. The process of claim 5 in which the increasing includes adjusting a voltage from the power supply.

12. The process of claim 5 in which the increasing includes adjusting a voltage from the power supply in response to a control signal from the controller.

13. The process of claim 5 in which the detecting includes applying pullup voltages to both a CC1 terminal and a CC2 terminal of the receptacle.

14. The process of claim 5 in which the detecting includes applying pullup voltages to both a CC1 terminal and a CC2 terminal of the receptacle and monitoring a voltage value on the CC1 and CC2 terminals.

15. The process of claim 14 in which the monitoring includes comparing a voltage at a CC1 terminal and a voltage at a CC2 terminal of the receptacle to a threshold.

16. The process of claim 15 in which the monitoring includes determining an Open state, a Rd-attached state, and a Ra-attached state.

* * * * *